W. F. HOLT.
TRANSPORTATION SYSTEM.
APPLICATION FILED MAR. 13, 1916.

1,212,487.

Patented Jan. 16, 1917.

Witnesses:
Lute A. Alter
Sully Grusso

Inventor
William F. Holt
By Frederick Whyper
Attorneys

UNITED STATES PATENT OFFICE.

WILLIAM F. HOLT, OF REDLANDS, CALIFORNIA.

TRANSPORTATION SYSTEM.

1,212,487.  Specification of Letters Patent.  Patented Jan. 16, 1917.

Application filed March 13, 1916. Serial No. 83,731.

*To all whom it may concern:*

Be it known that I, WILLIAM F. HOLT, a citizen of the United States, residing at Redlands, in the county of San Bernardino and State of California, have invented a new and useful Transportation System, of which the following is a specification.

This invention relates to transportation of merchandise by a power-operated vehicle capable of traveling on rails and also traveling on an ordinary roadway without change of the vehicle in any respect to enable the merchandise to be transported from one place to another without changing the merchandise from one vehicle to another.

An object of this invention is to effect the foregoing by a construction which will not be liable to derail the vehicle when said vehicle is traveling on the rails.

Another object is to produce a construction whereby ease of operation of the vehicle on different characters of surface is maximized.

Other objects and advantages may appear in the subjoined detail description.

The accompanying drawings illustrate the invention.

Figure 1:
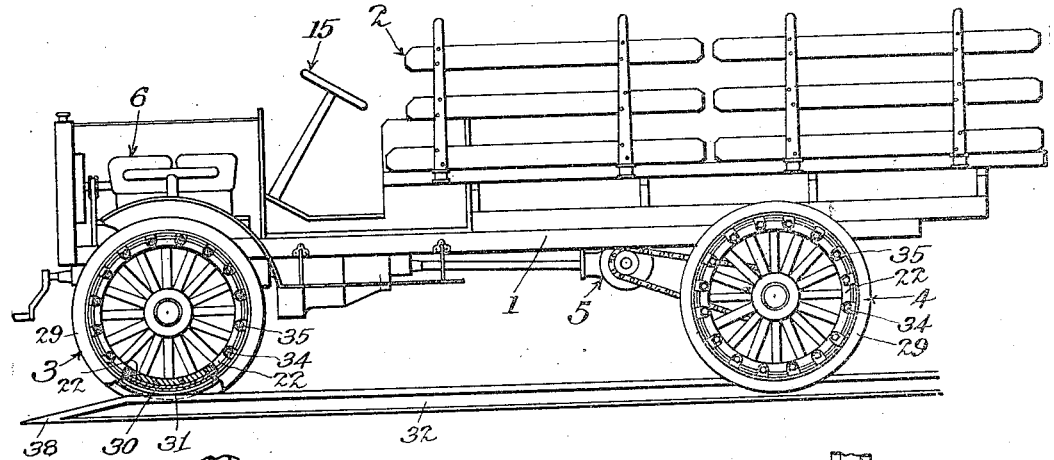
Figure 2:
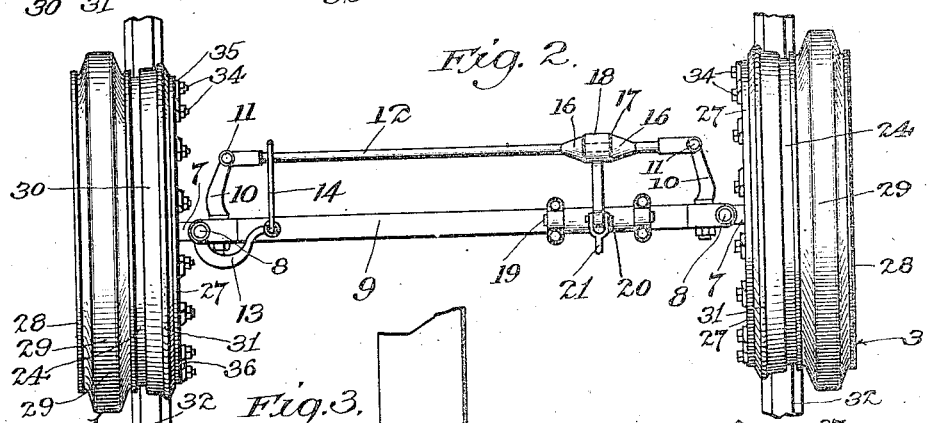
Figure 2:
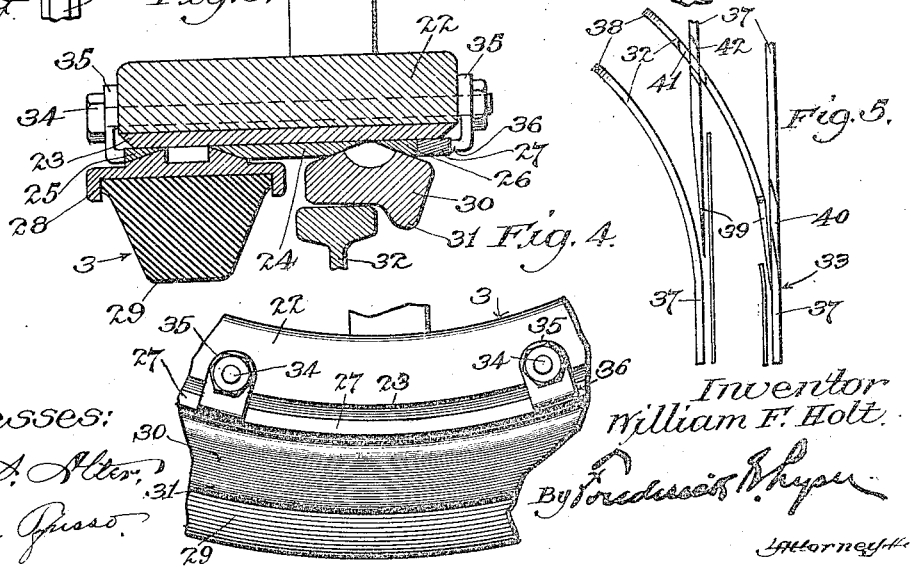

Figure 1 is a side elevation embodying the newly invented transportation system, the rim of one of the front wheels being partly broken away for clearness of illustration. Fig. 2 is a plan view of the dirigible wheels, their steering connections and the means for locking the steering connections against movement, fragments of the rails also being shown. Fig. 3 is an enlarged sectional elevation through the rim portion of one of the vehicle wheels, a fragment of one of the rails also being shown. Fig. 4 is a side elevation from the right of Fig. 3. Fig. 5 is a plan view of the railroad track system in Fig. 1.

There is provided a vehicle frame 1 having a body 2 of any desired construction, said frame being provided with dirigible front wheels 3 and driven rear wheels 4 which are connected by any suitable driving mechanism 5 to a motor or engine 6 mounted on the vehicle frame. The engine shown is of the internal combustion type.

The front wheels 3 are dirigibly connected by stub axles 7 and knuckles 8 to a main front axle 9 and the stub axles are interconnected by arms 10, pivots 11 and a steering bar 12. One of the stub axles 7 is provided with a steering arm 13 connected by a connecting rod 14 to a hand-wheel-operated steering device 15 in a manner well understood in the art and therefore not necessary to show and describe in detail herein.

Means are provided to lock the steering bar 12 against endwise movement and in Fig. 2 are shown means corresponding to those disclosed in my patent for steering bar locks dated January 25, 1916, No. 1,169,402.

The steering bar locking means are constructed as follows: The steering bar 12 is provided at suitable points therealong with spaced apart outwardly tapered collars or stops 16 forming therebetween a notch 17 to receive one end of a bell-crank lever 18. The bell-crank lever 18 is pivoted at 19 on the front axle 9 and is pivoted at 20 to an operating rod 21 which may be extended to within reach of the driver of the vehicle and may, if desired, be provided with any suitable system of levers or other operating mechanism, not shown.

The vehicle wheels 3, 4 are all of the same construction (as one another) and therefore a description of one will suffice to describe each of them as follows: There is provided a felly 22 preferably of wood having shrunk thereon a metal band 23 which forms a seat for an intermediate ring 24 and outer rings 25, 26, 27. The intermediate ring 24 is beveled at its edge toward the center of the wheel and the rings 25, 26 are beveled inward toward the center of the wheel. Seated between the beveled face of the ring 25 and one of the beveled edges of the ring 24 is a complementarily beveled flanged metal rim 28 having a tire 29 thereon, said tire being of resilient material such as rubber or analogous substance. Between the beveled face of the ring 26 and the other beveled edge of the ring 24 is seated a complementarily beveled metal tread 30 having a flange 31 and adapted to travel on the rail 32 of a railroad track system 33.

The felly 22 is provided with bolts 34 extending from side to side thereof and having washers 35 at both ends. The washers 35 are provided with inwardly projecting lugs 36, the lugs of the washers at one side pressing against the ring 25, and the lugs of the washers at the other side pressing against the ring 27 so as to firmly hold the rim 28 and tread 30 in place.

The track system 33 may comprise main rails 37 and the rails 32 mentioned above, see Fig. 5. The rails 32 may form a switch and terminate in beveled ends 38, the opposite ends of the switch rails 32 being provided with adjustable switch tongues 39 so that the main line rails 37 may be connected and disconnected with the switch rails 32 when desired.

One of the main line rails 37 is provided with a slot 40 to allow the resilient tire 29 to pass therethrough when the tread 30 rolls from the switch tongue 39 to said main rail, and one of the switch rails 32 is provided with a slot 41 so that when the vehicle is traveling on the main line the tire 29 can pass said rail 32. The other main line rail 37 is provided with a slot 42 to allow the tire 29 to pass therethrough when the tread 30 is traveling on the switch rail.

In practice, assuming that the engine 6 is in operation, the vehicle will be driven over an ordinary roadway to the warehouse or other place to receive a load of goods, and after receiving said load, said vehicle will be driven on to the switch rails 32 and thence on to the main line rails 37 and so on to its destination where the goods may be unloaded while the vehicle is on the rails, or, if necessary, the vehicle may be driven from the main line over switch rails corresponding to those hereinbefore described, and then the vehicle will be driven under its own power over a common roadway to any destination remote from the railroad track system.

It is noted that besides obtaining easy riding of the vehicle over ordinary roads because of the provision of the resilient tires 29, said tires are of advantage in event of their striking any obstructions along the rails, for if such obstructions, such as stones or the like, are struck by the resilient tires, the vehicle will not be derailed and the shock thereon will be minimized owing to compression of the tire 29. If the tire 29 were of metal, derailing of the vehicle would very likely result every time said tire struck a small stone or the like lying adjacent the rail along which the tire is traveling. By using resilient tires, I am enabled to make said tires of considerably larger outside diameter than the diameter of the tread face of the metal tread 30 so that when the vehicle is traveling on an ordinary road the tires 29 will function to absorb shocks without liability of the flanges 31 coming into contact with the road surface, which contact would tend to injure said road surface and produce jarring and jolting of the vehicle.

When the vehicle has been driven from the ordinary roadway to the rails, the rod 21 will be operated to move the lever 18 into engagement with the slot 17 to lock the steering mechanism and thus hold the wheels 3 against deflection; and, when the vehicle has been driven from the rails to the ordinary roadway, the rod 21 will be operated to move the lever 18 out of engagement with the slot 17 to unlock the steering mechanism and then the hand wheel 15 will be operated to steer the vehicle in any desired direction in a manner well understood in the automobile art.

It is understood that the body of the vehicle may be of a design suitable for merchandise or suitable for passenger traffic so that either may be transported from place to place.

I claim:

1. The combination with a pair of rails, of front and rear wheels having flanged treads fitting said rails, said wheels also having plain resilient treads of larger outside diameter than the flanged treads, an axle dirigibly connected to the front wheels, means to steer the front wheels, means to lock said steering means against movement, a vehicle frame, an engine mounted on said frame, and driving gear connecting the engine to the rear wheels.

2. A track system having main line rails and having switch rails, said switch rails terminating in beveled ends, a wheeled vehicle, the wheels of said vehicle having flanged railroad treads properly spaced to fit the rails and said wheels having resilient tires of greater diameter than said railroad treads, an engine on the vehicle operatively connected to said wheels, means to steer the front wheels when the wheels are off of the rails, and means to lock the steering means when the wheels are on the rails to hold the front wheels against steering movement.

3. A wheel comprising a felly, an outer ring fitting on said felly, an intermediate ring fitting on the first named ring and provided with beveled edges, outer rings fitting on the first named ring at the respective sides of the first named ring and provided with beveled inner edges, a flanged metal rim provided with beveled faces fitting the beveled edge of one of said outer rings and fitting one beveled edge of the intermediate ring, an annular metal tread having an outwardly extending flange and having beveled faces fitting the beveled edge of the other of said outer rings and fitting the other edge of the intermediate ring, a resilient tire of larger outside diameter than the flange of the annular tread seated on the flanged metal rim, and means to hold the outer rings toward said intermediate ring.

4. A wheel comprising a felly, a resilient tire, an annular metal tread having a flange of less diameter than the tire, and means independently and detachably holding said tire and metal tread in place on the felly.

5. In combination, a vehicle frame, front wheels dirigibly connected to the frame, rear wheels rotatively mounted on the frame, each of said wheels having a felly and having a resilient tire and having an annular flanged metal tread of less diameter than the resilient tire and having means independently and detachably holding said tire and metal tread in place on the felly, an engine mounted on the frame, driving connections between the engine and rear wheels, means to steer the front wheels, and means to lock the steering means to hold the front wheels against steering movement when the flanged treads are on the rails of a railroad track system.

Signed at Los Angeles, California, this 7th day of March, 1916.

WILLIAM F. HOLT.

Witnesses:
GEORGE H. HILES,
ANNA F. SCHMIDTBAUER.